United States Patent [19]

Dexel et al.

[11] Patent Number: 4,747,013
[45] Date of Patent: May 24, 1988

[54] ELECTRICAL CAPACITOR WITH TEAROFF INTERRUPTER

[75] Inventors: Rudolf Dexel, Berlin; Wolfhart Dunkel, Annatal, both of Fed. Rep. of Germany

[73] Assignee: Licentia Patent-Verwaltungs GmbH, Frankfurt am Main, Fed. Rep. of Germany

[21] Appl. No.: 14,501

[22] Filed: Feb. 13, 1987

[30] Foreign Application Priority Data

Feb. 15, 1986 [DE] Fed. Rep. of Germany ....... 3604887
Nov. 21, 1986 [DE] Fed. Rep. of Germany ....... 3639791

[51] Int. Cl.⁴ .......................... H01G 1/11; H01G 7/00
[52] U.S. Cl. .................................... 361/272; 29/25.42
[58] Field of Search .................... 29/25.42, 433 W; 361/272, 275

[56] References Cited

U.S. PATENT DOCUMENTS

| | | | |
|---|---|---|---|
| 1,823,328 | 9/1931 | Marbury | 361/275 |
| 3,436,610 | 4/1969 | Sparrow et al. | 361/433 W |
| 3,909,683 | 9/1975 | Kysely | 361/272 |
| 3,911,166 | 10/1975 | Bailey | 361/272 |
| 4,618,910 | 10/1986 | Strang et al. | 361/275 |
| 4,633,365 | 12/1986 | Stockman | 361/272 |

FOREIGN PATENT DOCUMENTS

| | | | |
|---|---|---|---|
| 241480 | 1/1961 | Australia | 361/272 |
| 1589985 | 4/1971 | Fed. Rep. of Germany . | |
| 2350271 | 4/1975 | Fed. Rep. of Germany | 361/272 |
| 3110979 | 6/1982 | Fed. Rep. of Germany . | |
| 8108053 | 9/1982 | Fed. Rep. of Germany . | |
| 55765 | 5/1978 | Japan | 361/272 |

*Primary Examiner*—Donald A. Griffin
*Attorney, Agent, or Firm*—Spencer & Frank

[57] ABSTRACT

An electrical capacitor composed of: a coil composed of metal coatings and having opposed end faces; contact layers applied to the end faces of the coil; a casing enclosing the coil; and a conductor structure including a tearable interrupter conductor connecting the contact layers to external capacitor terminals, the conductor being disposed to rupture, and thus break the connection between the capacitor and one external terminal, in response to enlargement of the coil due to a fault, and the casing being disposed directly against the coil and adhering to the interrupter conductor in such a manner that the casing ruptures in response to such enlargement of the coil and promotes rupture of the interrupter conductor.

25 Claims, 2 Drawing Sheets

ELECTRICAL CAPACITOR WITH TEAROFF INTERRUPTER

BACKGROUND OF THE INVENTION

The present invention relates to an electrical interrupter for a capacitor coil. Such an interrupter is disclosed in FRG Pat. No. 2,350,271 and GB Pat. No. 1441507.

In this prior art arrangement gas formation in dielectric material is utilized when there is undue heat development due to a defect or fault in the capacitor coil. A breakable or tearable conductor applied to a surface of the capacitor coil bulges out when there is excess pressure in the coil interior so that the conductor is interrupted by such excess pressure. This requires that the covering of the capacitor coil itself not be deformed by the excess pressure.

In a defined zone within the casing, which acts as a pressure vessel and remains intact even in the case of a defect, a desired break location is provided at the capacitor coil in the form of a plate of insulating material equipped with grooves or notches. This plate supports a breakable conductor in the form of a glued-on metal foil or a vapor-deposited metal layer.

On the side of the plate of insulating material facing away from the capacitor coil, an elastic material is provided within the casing which enables the plate of insulating material to be pressed into this elastic material when the capacitor coil bulges out under the pressure of the gas. This causes the plate of insulating material to break and thus the conductor to be interrupted. Due to this interruption, the circuit leading through the conductor from external terminals of the capacitor is switched off.

In those cases in which the capacitor coil is wound of a metallized plastic sheet, generally no gas develops in the case of a defect to produce excess pressure which would actuate the interrupter. The partial surface enlargement of the capacitor coil occurring in the case of a defect may become active, in contrast to gas pressure, at a location at which there happens to be no plate of insulating material and no breakable conductor so that the prior art arrangement often fails in such cases.

German Pat. No. 1,289,584 discloses a capacitor having an interrupter which breaks under excess pressure. In this case, a capacitor coil in insulating oil is installed in a housing which is able to expand in the direction of the coil axis. In the case of damage, overheating at the point of the defect produces heavy gas development which generates a pressure acting also in the direction of the coil axis, thus lengthening the housing at the point of expansion. This causes an internal connecting wire to break and to interrupt the current flow.

The prior art structures are costly in that in every case the capacitor coil must be installed in a suitable housing and additionally an impregnating agent is required to generate excess gas pressure in the case of a defect. Therefore, these solutions are not very well suited for capacitor coils which do not require impregnation, i.e. particularly for metallized sheet capacitors.

SUMMARY OF THE INVENTION

It is an object of the present invention to provide an electrical interrupter of the above-mentioned type in which a bare capacitor coil, i.e. one without a housing, made of a metallized plastic sheet and without impregnation or casing is reliably switched off in the case of damage which results in gas formation.

The above and other objects are achieved, according to the invention, by the provision of an electrical capacitor comprising: a coil composed of metal coatings and having opposed end faces; contact layers applied to the end faces of the coil; a casing enclosing the coil; and means including a tearable interrupter conductor connecting the contact layers to external capacitor terminals, the conductor being disposed to rupture, and thus break the connection between the capacitor and one external terminal, in response to enlargement of the coil due to a fault; wherein the casing is disposed directly against the coil and adheres to the interrupter conductor in such a manner that the casing ruptures in response to such enlargement of the coil and promotes rupture of the interrupter conductor.

In the case of an electrical overload in the capacitor coil, the coil geometry will be deformed, thus bursting the casing and interrupting the interrupter conductor adhering thereto at the bursting location. The structure according to the present invention has the advantage that capacitor coils can be installed in a housing as individually electrically protected elements, either individually or in groups of several, with the nature of the housing no longer being significant for the operation of the interrupter. According to the present invention, it is not the finished capacitor which is provided with a circuit interrupter but already the not yet installed capacitor coil, so that the manufacturer of such capacitors advantageously has available to him many possible installation variations.

The casing must be fully operational in the above-described manner over the entire operating temperature range of the capacitor, i.e. the casing must not be damaged in this temperature range without endangering the coil and, in the case of damage to the coil with resulting coil deformation, it must burst within the entire temperature range. The interrupter conductor adhering to the casing must behave in the same sense.

Advantageous features of the invention are described below and in the claims.

A suitable casing, which preferably surrounds the capacitor coil on all sides and is particularly hard and brittle, is obtained by a coating of reaction resins which, in the dried or hardened state, exhibit a glass transition temperature which corresponds to at least the upper permissible capacitor temperature and which have sufficient brittleness in the permissible temperature range to assure tearing or bursting if the capacitor coil is deformed.

Such coatings can be obtained from resins having different chemical bases. Preferably, unsaturated polyester resins, unsaturated esterimide resins, epoxy resins, polyurethane resins and phenol resins are preferred for this purpose together with suitable hardeners customary for these resins as well as combinations of such resins. Moreover, to enable these coating resins to attain the desired property profile, they may contain further additives such as, for example, cross-linking density increasing components, thixotropy producing agents, fillers and dyestuffs.

The coating can be hardened at room temperature or at an elevated temperature. It is particularly advantageous to harden the coating, after it has been applied to the capacitor coil, by means of radiation, particularly exposure to light.

A second, suitable casing material for the capacitor coil is an inorganic glass coating. Glass solders which have a relatively low melting point and do not thermally overload the coils to be encased are used with preference for the production of a casing according to the present invention. The thickness of such glass coating may lie in a range from 0.05 to 1.5 mm, and preferably in a range from 0.15 to 1.0 mm.

All methods suitable for the production of reaction resin coatings on molded bodies and for coating employing a glass solder can be used for the application of the capacitor coil coatings, or casings, according to the invention. For the present case of encasing capacitor coils by coating them, the immersion method, the electrostatic coating method and the whirl sintering method are preferred.

Various manufacturing procedures are applicable for applying the interrupt conductor according to the invention, including:

(a) A conductive coating is applied, for example by screen printing, over the circumferential area of the coil. Thereafter, a conductive tape is or strip is produced from this coating, for example by "milling"—as known from the production of carbon coated resistors—or by etching away as is done for circuit boards, with the beginning and end of the conductive tape lying at opposite axial end faces of the coil. The one end of the conductive tape is connected, for example by soldering, with the connecting terminal of the coil and the other end of the conductive tape is attached to an external terminal;

(b) In another embodiment, an interruptible wire is placed around the circumference of the coil as the interrupt conductor which is interrupted in the case of destruction of the coil. The terminals are applied analogously to the above-described method. This version is particularly suitable for casings produced in an immersion process, since the interrupt wire is fixed by means of an additional immersion process and is integrated in the casing;

(c) In a further embodiment, the path of the interrupt conductor is produced in that conductive material is applied along that path directly in a screen printing process;

(d) In another embodiment, the interrupt conductor is produced by using the additive technique known from the circuit board art;

(e) Alternatively, the path for the interrupt conductor is produced in such a manner that an appropriate mask is used to produce the conductive path by metallization, for example by a metal vapor-deposition process or metal spraying process. Or the procedure may be as described under (a), above, in that initially a planar metallization is applied on the casing and then the conductor is produced by "milling"; and (f) Finally, the path for the interrupt conductor is produced in that a narrow, preferably self-adhesive, thin metal foil tape is applied.

Preferably, the interrupt conductor extends spirally directly around the capacitor coil and is then bonded to the subsequently applied casing. However, instead of being placed underneath the casing, the interrupt conductor may also be applied and bonded to the outside of the casing. Finally, in the latter case, an additional coating may be applied over the interrupt conductor.

In a particularly advantageous embodiment of the interrupter according to the invention, the operating reliability of the interrupt conductor is further increased by providing it with spaced reduced cross-sectional areas as the desired break locations. Due to the differences in cross-sectional area, meshing with the casing is very good so that the interrupt conductor is securely fixed across the relatively small spaces. This excludes possible elastic deformation of the metal electrical conductor material and a possible "migration" of the interrupt conductor without a break if the surface deformations of the capacitor coil are perhaps only slight.

The reductions in cross-sectional area may be provided in the form of punched-out notches and/or wedge-shaped recesses on one or both sides of the edge of the interrupt conductor.

The invention is suitable for all metallized sheet capacitors in dry construction, e.g. for MKP capacitors for use in motor and fluorescent lamp capacitors.

The present invention will be described in greater detail below with reference to embodiments that are illustrated in the drawings.

DESCRIPTION OF THE PREFERRED EMBODIMENTS

Figure 1:
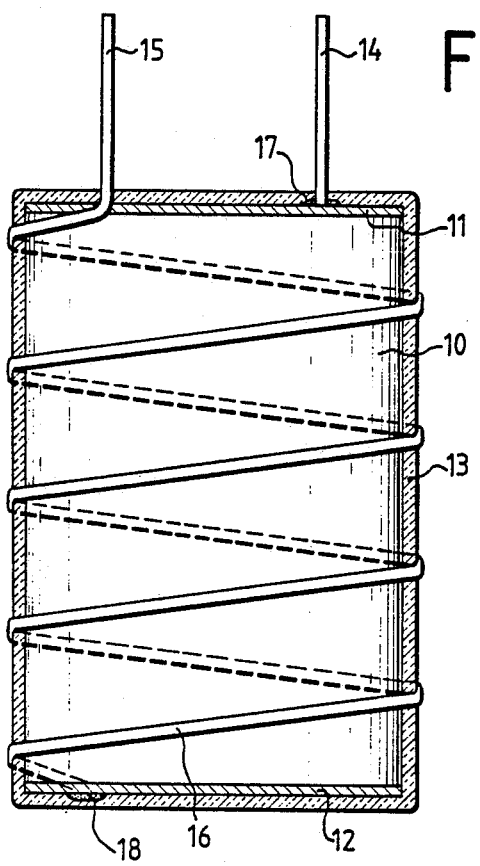
FIG. 1 is partly cross-sectional view of an interrupter according to the invention with an interrupter conductor applied to the casing of the capacitor coil.

FIG. 1 shows a capacitor 10 made of a coiled metallized plastic sheet (not shown in detail) in which contact layers 11 and 12 are sprayed on the ends to serve as upper and lower capacitor contacts. Capacitor coil 10 is completely enclosed, i.e. also on its frontal faces, with a hard, brittle and closely adhering casing 13. Two external terminals 14 and 15 extend from one frontal face of the capacitor coil. Terminal 14 is welded or soldered directly to contact layer 11 at point 17. Terminal 15 is connected to one end of an electrical interrupter conductor 16 which spirally surrounds coil 10. The other end of conductor 16 is electrically conductively connected, e.g. soldered or welded, at point 18 to the other contact layer 12.

If there is any internal damage to capacitor coil 10 and resulting geometric deformation, casing 13 tears or bursts so that simultaneously interrupter conductor 16 disposed in the area of destruction of casing 13 is interrupted at at least one point. The electrical circuit through capacitor coil 10 is thus reliably interrupted.

Figure 2:
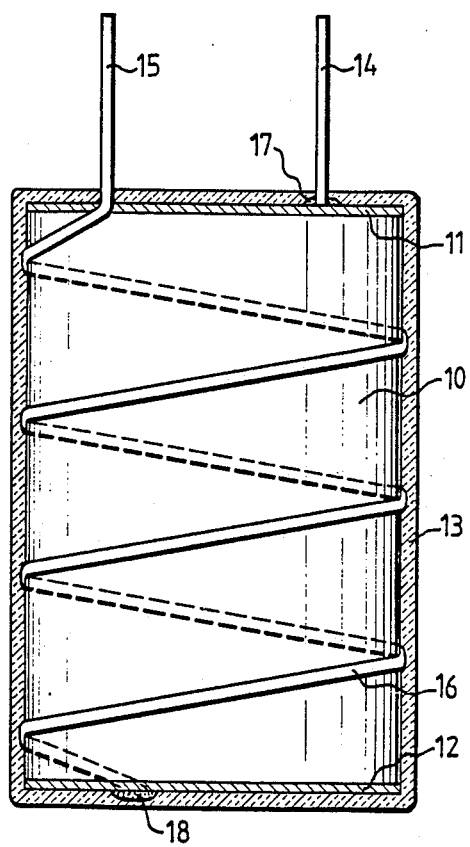
FIG. 2 is a view similar to that of FIG. 1 of an interrupter according to the invention which has its interrupter conductor extending underneath the casing of the capacitor coil.

In FIG. 2, identical parts bear the same reference numerals as in FIG. 1. The only, but significant, difference from the interrupter according to FIG. 1 is that interrupter conductor 16 of FIG. 2 extends directly on the surface of capacitor coil 10 and thus spirally within casing 13. This embodiment is optimum in manufacture, with interrupter conductor 16 nevertheless being well bonded to casing 13 when the latter is applied.

Figure 3:
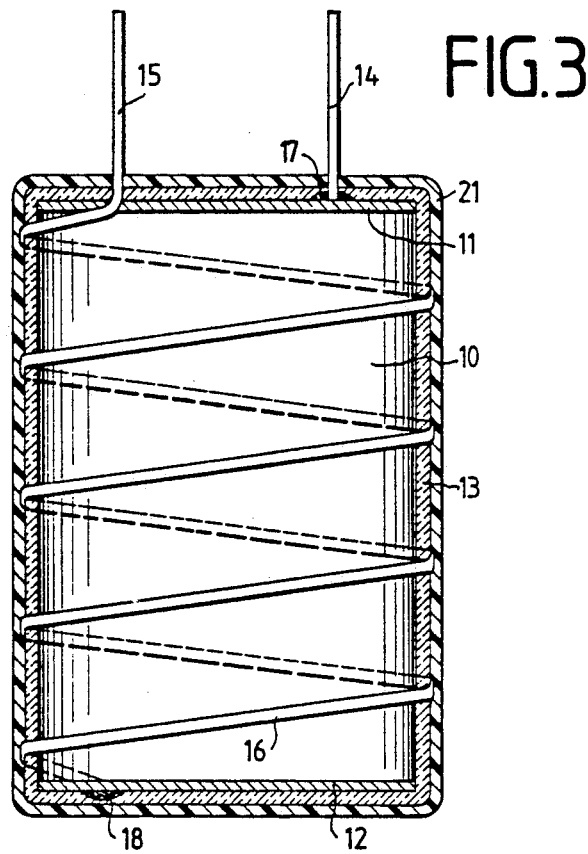
FIG. 3 is another view similar to that of FIG. 1 of an interrupter to the invention which has its interrupter conductor embedded between the casing of the capacitor coil and an additional coating.

In FIG. 3, identical parts bear the same reference numerals as in FIGS. 1 and 2. In this embodiment interrupter conductor 16 is embedded between casing 13 and an additional coating 21.

Figure 4:
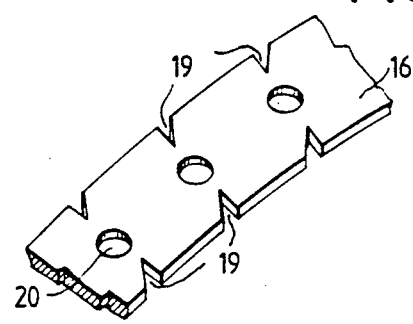
FIG. 4 is a partly view of an interrupter conductor being a metal foil tape which is provided with spaced regions of reduced cross-sectional area configured as punched-out notches and wedge-shaped recesses along both edges of the interrupter conductor.

FIG. 4 shows a part of interrupter conductor 16 having spaced regions of reduced cross-sectional area to serve as preferential break locations due to punched-out notches 20 and wedge-shaped recesses 19 along both edges of interrupter conductor 16.

The following casing made of an unsaturated polyester resin serves as an example.

An orthophthalic acid polyester containing standard glycol and dissolved in styrene is used as the basic resin. The styrene content is about 35 weight percent. Such a resin has a viscosity of 850 to 1200 mPa·s at 23° C. and an acid number of 31±2 mg KOH/g as well as a double bond value (equivalent fumaric acid per 100 g resin) of about 0.22.

This basic resin is pigmented with titanium dioxide-3 weight %- and Aerosil [trademark for submicroscopic pyrogenic silica made at 1100° C.]—2 weight percent—and is set to be thixotropic. In a special embodiment, the resin mixture contains a hardener in the form of a light [photo] initiator from the group of acyl phosphine oxides whose light absorption maximum lies in a wavelength range from 365 to 410 nm. The viscosity of such a resin mixture is in a range from 1500 to 3000 mPa·s at 23° C.

UV lamps which do not emit short-wave ultraviolet radiation can be used for hardening. Commercially available lamps, such as they are used, for example, in solariums (UV-A radiators) can be used here. Depending on the concentration of the initiator, the layer thickness of the resin, the radiation intensity of the UVA lamp and the distance of the lamp, hardening occurs in a period from 0.5 to 10 minutes. For example, a resin layer having a thickness of 100 μm hardens within one minute. The hardened resin layer then has a glass transition temperature from 110° to 120° C., measured in a torsion vibration test.

An epoxy resin system suitable for the capacitor casing is composed as follows: it is a two-component system. Component A includes a bisphenol-A-diglycidyl ether (possibly including a reactive dilution agent) which has a viscosity of 7,000 to 11,000 mPa·s at 25° C. and has an epoxide value (mol epoxide per 100 g resin) of 0.51 to 0.56. To the epoxy resin, 2.5 weight % Aerosil (e.g. R 202 made by Degussa) can be added as thixotropy enhancing agent.

Component B is an amine hardener, in this example a modified product based on isophorone diamine having a viscosity of about 10 to 20 mPa·s at 25° C., an amine number of 660±5 and an amine hydrogen equivalent weight of about 44.

Components A and B are homogeneously mixed at a weight ratio of 100:25. This mixture can be used directly for the capacitor casing. It has a viscosity of about 1500±200 mPa ·s at 23° C. and a processing time of about 90 minutes. Hardening occurs at room temperature with a subsequent heat treatment at 100° C. for, for example, 3 hours. The glass transition temperature is then 115° to 130° C.

The following two-component system is given as an example for a polyurethane casing for the capacitor coil: component A is composed of diphenyl methane diisocyanate having an NCO content of 30% to 32% and a viscosity of 100 to 150 mPa·s at 25° C.

Component B is a branched polyether glycol having an OH content of 15% to 18% and a viscosity of 1800±250 mPa·s at 25° C., to which are added 10 parts by weight zeolite paste (sodium aluminum silicate). In order to accelerate hardening, the mixture additionally contains 0.1% dibutyl tin dilaurate.

Components A and B are mixed at a ratio of 100:125. Due to the high reactivity of the coating substance, processing can take place only by means of two-component mixing and dosaging machines, for example in a modified two-component airless spray system. This substance gels after about 5 minutes. Hardening occurs at room temperature or at elevated temperatures up to 80° C. Glass transition temperatures of ≧100° C. were realized.

An exemplary inorganic, glass-like coating is the two-component coating "Kleiberit ® Thermoguss 2000" which can be obtained, for example, from Klebchemie, D-7504 Weingarten, Federal Republic of Germany.

Component A is an inorganic powder based on aluminum and magnesium oxide, component B is a so-called waterglass (alkali silicate) in aqueous solution.

Homogeneous mixing of components A and B at a ratio of, for example, 1:1, produces an immersion substance in which the capacitor coil is coated by dipping it into this substance. The period of use for such a substance is about 3 hours. The coating hardens within 1 to 2 hours at 80° C. A heat treatment to remove residual moisture is advantageous.

To seal the casing surface against the influence of humidity, an additional coating of an organic lacquer, e.g. a silicone protective lacquer, may be favorable.

Given below is an example of the production of a capacitor coil equipped with a tear-off interrupter according to the invention as shown, for example, in FIG. 3. On the capacitor coil including the contacted frontal faces, an area of about 0.25 cm² on each frontal face is protected by masking. Then the capacitor coil is picked up by the core tube around which the capacitor coil has been wound and is coated with the light-hardening, unsaturated polyester resin mentioned above as an example by spraying on the resin while rotating the coil. The sprayed-on first layer is then hardened under a UVA lamp. The layer thickness at the frontal faces as well as on the cylinder jacket should be about 500 to 1000 μm. Then the contacting areas on the frontal faces which had been protected by masking are exposed. A connecting wire is soldered to one of the two contact faces. The interrupter conductor in the form of a specially configured copper band is soldered to the other contact face of this example.

The special configuration of the copper band resides in the fact that it is a tin-plated copper band 50 μm thick and 8 mm wide, which is provided with punched holes at regular intervals of 10 mm (measured from center to center of the hole) with a diameter of 3.5 mm. This interrupter conductor is wound in the form of a spiral and with light tension around the coated coil, with a spacing of 8 mm between turns until the opposite contacting face (bridge) has been reached. The interrupter conductor is then fixed on the coated frontal face and soldered to a wire lead. After application of the interrupter conductor, the coil is again picked up by the core tube and again coated with the unsaturated polyester resin, thereby fixing and insulating the interrupter conductor in that the resin penetrates into the holes of the interrupter conductor and coats it on all sides. Hardening takes place analogously to the first coating by UVA radiation. This completes the production of a capacitor having an integrated tear-off interrupter. The total thickness of the resin coating lies in a range from 1000 to 2000 μm.

A capacitor coil having a tear-off interrupter as shown in FIG. 1 is produced, for example, as follows:

A connecting wire is soldered in the conventional manner to one of the two frontal faces of the capacitor coil. A lacquered round copper wire having a diameter of 0.35 mm is then soldered to the other frontal face. Advantageously, a solderable round wire is employed, for example a wire lacquered with polyurethane. The copper wire as the interrupter conductor is then helically wound around the capacitor coil with the turns spaced at 10 mm until the opposite bridge is reached. There it is fixed on the bridge (depending on the size of the capacitor, possibly on an insulating substrate) and is soldered to a second lead wire. The capacitor coil thus provided with a wire-shaped interrupter conductor is then again picked up by the core tube and is coated with one of the above-described coating resins. As in the example above, this coating may be applied by spraying the coil with the light-hardening, unsaturated polyester resin or just as well by immersion. As mentioned above, polyurethane coatings, glass-like inorganic coatings, unsaturated ester imide resin coatings or phenol resin lacquers can be used in the same way for the coating instead of the polyester resin epoxy resin formulations. In order to obtain the desired final characteristics of the coating, a thermal after treatment at temperatures up to 100° C. is expedient with this manner of proceeding.

The invention now being fully described, it will be apparent to one of ordinary skill in the art that many changes and modifications can be made thereto without departing from the spirit or scope of the invention as set forth herein.

The present disclosure relates to the subject matter disclosed in German Application Nos. P 36 04 887.9 of Feb. 15th, 1986 and P 36 39 791.1 of Nov. 21st, 1986, the entire specifications of which are incorporated herein by reference.

What is claimed is:

1. An electrical capacitor comprising: a coil composed of metal coatings and having opposed end faces; contact layers applied to the end faces of said coil for contacting said metal coatings; a hard and brittle casing firmly adhering to, and enclosing, said coil; and connecting means for connecting said contact layers to external terminals, said means including a tearable interrupter conductor conductively connecting one said contact layer to one external terminal and disposed to rupture, and thus break the connection between said capacitor and the one external terminal, in response to enlargement of said coil due to fault, wherein: said interrupter conductor has a spiral form composed of a plurality of turns wrapped around said coil; said casing is constituted by a coating having a thickness of 0.5 to 1.5 mm applied to said coil; said capacitor is disposed such that expansion of said coating in the radial direction of said coil is unimpeded; and said interrupter conductor is firmly bonded to said coating over the entire circumference of said coating such that in response to the application of a radial outward force by said coil to said coating, said coating ruptures without impediment and thus, at any location about the circumference of said coil, effects rupture of said interrupter conductor.

2. A capacitor as defined in claim 1 wherein said coating is composed of a reaction resin coating.

3. A capacitor as defined in claim 2 wherein said reaction resin coating comprises an unsaturated polyester binder.

4. A capacitor as defined in claim 2 wherein said reaction resin coating comprises an unsaturated esterimide resin.

5. A capacitor as defined in claim 2 wherein said reaction resin coating comprises an epoxy resin system binder.

6. A capacitor as defined in claim 2 wherein said reaction resin coating comprises a polyurethane resin binder.

7. A capacitor as defined in claim 2 wherein said reaction resin coating comprises a phenol resin binder.

8. A capacitor as defined in claim 1 wherein said coating comprises a glass coating on said coil.

9. A capacitor as defined in claim 1 wherein said interrupter conductor is a conductor applied by screen printing.

10. A capacitor as defined in claim 1 wherein said interrupter conductor is formed by partial removal of a continuous metallized coating.

11. A capacitor as defined in claim 1 wherein said interrupter conductor is a conductor applied in an additive process by currentless metallization.

12. A capacitor as defined in claim 1 wherein said interrupter conductor is applied by metal vapor deposition.

13. A capacitor as defined in claim 1 wherein said interrupter conductor is applied by metal spraying.

14. A capacitor as defined in claim 1 wherein said interrupter conductor is configured as a wire which is wound about said coil and along one surface of said coating.

15. A capacitor as defined in claim 1 wherein said interrupter conductor is a metal foil tape wound about said coil and along one surface of said coating.

16. A capacitor as defined in claim 15 wherein the metal foil tape is self-adhesive.

17. A capacitor as defined in claim 1 further comprising an additional coating securing said interrupter conductor to said casing.

18. A capacitor as defined in claim 17 wherein the total thickness of said casing and said coating is no greater than 2 mm.

19. A capacitor as defined in claim 17 wherein said capacitor is in radial force-transmitting communication with only said casing, said interrupter conductor, and said additional coating.

20. Method for producing the capacitor defined in claim 1 comprising applying said coating to said coil by means of an immersion process, and subsequently hardening said casing.

21. Method for producing the capacitor defined in claim 1 comprising applying said coating to said coil by an electrostatic coating process.

22. Method for producing the capacitor defined in claim 1 comprising applying sais coating to said coil by a whirl sintering process.

23. Method for producing the capacitor defined in claim 1 comprising forming said coating by applying a radiation-hardenable composition to said coil and applying radiation to the composition to harden it.

24. Method as defined in claim 23 wherein the radiation is light.

25. A capacitor as defined in claim 1 wherein said capacitor is in radial force-transmitting communication with only said coating and said interrupter conductor.

* * * * *